United States Patent [19]

Knecht

[11] 4,308,912
[45] Jan. 5, 1982

[54] HEAT TRANSFER SYSTEM

[76] Inventor: Bernath L. Knecht, 481 Pittsfield Dr., Worthington, Ohio 43085

[21] Appl. No.: 24,878

[22] Filed: Mar. 28, 1979

[51] Int. Cl.³ .................... F28D 15/00; G05D 23/00
[52] U.S. Cl. ........................................ 165/32; 165/40; 165/104.22; 126/422; 126/433; 126/419; 126/435; 236/92 B
[58] Field of Search ............... 165/105, 40, 39, 32; 62/333; 236/92 B; 126/422, 419, 433, 435; 237/7

[56] References Cited

U.S. PATENT DOCUMENTS

| | | | |
|---|---|---|---|
| 1,507,985 | 9/1924 | Brown | 237/7 |
| 2,196,778 | 4/1940 | Dodge | 236/92 B X |
| 2,210,511 | 8/1940 | Taylor | 62/333 X |
| 2,226,797 | 12/1940 | Andersson | 62/333 X |
| 2,380,029 | 7/1945 | Davidson | 62/333 X |
| 3,945,433 | 3/1976 | Koula | 165/39 |
| 4,061,131 | 12/1977 | Bohanon | 126/433 |
| 4,120,289 | 10/1978 | Bottum | 126/900 X |

Primary Examiner—Albert W. Davis
Attorney, Agent, or Firm—Robert E. Stebens

[57] ABSTRACT

A heat transfer system is provided having a fluid evaporator and a fluid condenser interconnected by fluid conducting conduit and including a volatile fluid as the heat transferring medium. The evaporator is incorporated in a solar panel and the condenser is disposed in heat transferring relationship to a water tank. A temperature control device including on a liquid accumulator tank and a pressure responsive valve is interconnected in the system and is operable to permit or prevent return of condensed fluid to the evaporator. One embodiment has the condenser disposed a distance vertically above the evaporator to provide a gravity return of liquid. A second embodiment of the system has the condenser and water tank disposed a distance vertically below the evaporator and the system additionally includes a device for intermittently returning liquid from the condenser to the evaporator at periodic intervals. The device for returning liquid includes a liquid collector tank positioned to receive liquid returned by gravity from the condenser and having a float actuated valve mechanism to alternatively prevent or permit fluid flow to the condenser whereby vaporization of fluid by the evaporator will develop gas pressure to return liquid from the collector tank to the evaporator through an intermediate liquid holding tank. A check valve is connected between the accumulator tank and holding tank to isolate the tanks during liquid return operation.

11 Claims, 6 Drawing Figures

HEAT TRANSFER SYSTEM

BACKGROUND OF THE INVENTION

This invention is directed to the providing of adequate heat for purposes of a water heater, or other heat utilization device, from an auxiliary standpoint or perhaps enable one to derive a small amount of useful heat for other purposes in the heating of a residential type of building. The source of heat for operation of the system and from which useful heat is obtained for effective transfer to the utilization device by this system is an available heat source but one which would otherwise remain unused. In particular, solar energy is a heat source with which this system is uniquely adapted. A solar powered heating system is normally expected to be supplemented by a gas or electric heating system which provides heat in the event that natural circumstances preclude the operation of the solar system whereas this may not be true with other types of available heat sources. This invention utilizes internal pressures and gravity for effecting the return of a heat transfer medium comprising a volatile fluid that is alternately vaporized and condensed. Additionally, this system includes a valve mechanism which functions as a temperature control for the heat transfer.

Several types of solar heating systems are known. Many have been developed recently in response to the need for additional sources of energy. One recent system developed by Bohanon, U.S. Pat. No. 4,061,131 granted Dec. 6, 1977, relates to a system capable of transferring heat automatically from an evaporator having a heat source of a relatively high temperature to a condenser associated with a heat sink of a lower temperature and at an elevation below that of its source without the necessity of using an external source of energy to return condensed liquid to the evaporator. Even with its advantages, Bohanon possesses some disadvantages. First, there is no temperature control. Fluid transfer in Bohanon's system is continuously maintained based on the level of fluid in the transfer tank. When enough fluid has accumulated in the transfer tank the drain valve is opened to permit liquid transfer into the evaporator. Regardless of the system temperature or whether the heat sink has reached its desired temperature, Bohanon continues to function allowing liquified fluid to continue to be returned to accumulate in the transfer tank and from which it continues to be periodically returned to the evaporator. Thus Bohanon's system continued to generate heat which is transferred to the heat sink regardless of its heat requirements.

Secondly, the transfer tank of Bohanon must be cooler than the heat sink to permit the system to effect liquid flow into the transfer tank. When the ambient temperature is close to or higher than the sink temperature, the Bohanon system will not function as the vapor pressure in the transfer tank will resist liquid flow. Therefore, when the system operates, either some transferred heat must be dissipated and lost in the process or the fact must be accepted that the system will be unable to function until the ambient temperature drops below that of the transfer tank. In direct contrast, the system of this present invention will deliver liquid to its accumulator regardless of the ambinet temperature or the minimum heat sink temperature. No heat, other than normal heat loss, is expended to facilitate operation of the system. In eliminating these two major disadvantages, the heat transfer system of this invention works better over a wider range of temperatures than Bohanon. This self return system possesses improved efficiency since a greater percentage of heat is actually transferred through the system.

Other known examples of heating systems of the type to which this invention is directed are illustrated in U.S. Pat. No. 2,210,511 issued to R. S. Taylor, U.S. Pat. No. 3,390,672 issued to C. D. Snelling, U.S. Pat. No. 3,991,938 issued to H. B. Ramcy and U.S. Pat. No. 4,007,776 issued to K. A. Alkasab. These patents, while illustrative of other heating systems having a self-contained liquid return feature, do not disclose apparatus possessing the advantages and improved functioning of the heat transfer system of this invention.

SUMMARY OF THE INVENTION

In accordance with this invention, a heat transfer system is provided and is advantageously used in a water heating system where solar energy is the primary heat source and an auxiliary heat source utilizing electrical power or a combustible fuel such as natural gas or oil when solar energy is either inadequate or unavailable. The components of the solar heating system are connected to a heat exchanger which is associated with a water heater tank that is connected into a pressurized water system of a residence along with a series connected conventional water heater that is heated by another energy source such as either gas or electricity. The solar heated water tank is connected with the conventional gas or electric heated water heater to allow for the heating of cold water first by the solar heating system and then by the gas or electric water heater when, or if, the solar powered system is inadequate to meet hot water requirements.

The first embodiment of the solar powered heat transfer system includes a heating panel having a liquid evaporator, a heat sink having a vapor condenser, a conduit interconnecting the evaporator and condenser, and an accummulator tank having valve means for effecting control over the temperature of the heat sink. A volatile fluid is contained within the system and is subjected to alternate vaporization and condensation to effect a transfer of heat. In this embodiment, a gravity type liquid return is used with the condenser and heat sink located within a building structure in relatively elevated relationship to the evaporator which is incorporated in the solar panel mounted exteriorally of the building. The accumulator tank is interposed in the conduit below the condenser for receiving liquid returning therefrom with the valve means selectively operable in responsive relationship to the heat sink temperature to either prevent return of liquid to the evaporator thereby effectively stopping further heat transfer or to permit liquid return and continuation of heat transfer.

Included in a second embodiment of the solar heat transfer system are a solar heating panel having a liquid evaporator, a vapor conduit, a liquid trap, a heat sink having a vapor condenser, a liquid conduit, a vent conduit, a liquid holding tank and an accumulator tank. The accumulator tank has valve means for affecting control over the temperature of the heat sink. The solar heating panel is located on the exterior of the building with the accumulator tank and liquid holding tank either outside or inside the building at the approximate elevation of the evaporator in the solar panel. The other components of the system are preferably located at or below the same level as the hot water heater which incorporates the heat sink and is at a lower elevation than the evaporator. This system is also designed for utilization of a volatile fluid as the heat transferring medium that is alternatingly vaporized and condensed in affecting heat exchange.

The solar heating panel comprises a plurality of small tubes arranged vertically between a top and bottom horizontal header and is specifically designed for operation with a volatile fluid as the heat transfer medium. The top header is of a greater diameter to facilitate separating the vapor from the liquid. The lower header is extended up one side to the top header to permit thermal convection of the fluid. In this second embodiment, a vapor conduit directly connects the top header to the liquid trap with the condenser receiving vapor from the trap. The panel serves to allow the volatile fluid to absorb heat from the rays of the sun. When sufficient heat is absorbed, the fluid vaporizes and passes through the vapor conduit to the condenser where it is condensed and transfers heat to the heat sink which is a water heater in this illustrative embodiment.

The liquid trap comprises a tank and a float-actuated valve, preferably of the butterfly or gate type, which does not have its operating force affected significantly by system pressures. The vaporized fluid passes into the liquid trap and rises into the heat sink, a water tank wrapped with coils, which is located above the liquid trap. Between the heat sink and the trap is a condensate vessel. The vapor condenses in the condenser associated with the heat sink and the heat is then transferred to the water in the heat sink. The condensed fluid, now in a liquid state, flows downwardly and accumulates in the liquid trap. When sufficient liquid has accumulated, the float closes the gate valve. Vapor pressure in the liquid trap and solar heating panel will now rapidly rise and it will eventually displace the liquid from the liquid trap through the liquid conduit into the liquid holding tank where the pressure is less than that of the trap thus returning liquid to the elevated position of the solar panel for subsequent vaporization. Vapor in the liquid holding tank and vent conduit may flow through the vent conduit and into the heat sink where it may condense thereby decreasing the pressure in the holding tank and facilitating the liquid return operation. The outlet of the accumulator for return of liquid to the solar panel is provided with a poppet-type valve which is pressure responsive but the system pressure is related to the temperature of the heat sink. When the heat reaches the maximum desired temperature corresponding to the pressure setting of the poppet-type valve, the valve closes thereby retaining the liquid in the accumulator instead of letting it return by gravity to the solar heating panel. When the valve is closed, the remaining liquid fluid in the solar panel is evaporated and the system ceases to function in effecting a transfer of heat until the temperature of the heat sink drops and thereby lowers the pressure below the set point of the poppet-type valve. The system then returns to normal operation.

Each of the two embodiments is also provided with second temperature control means which is functional to facilitate start-up of either system after a prolonged time period, such as overnight, and the solar panel is relatively cold. In that instance, the panel face may be covered with condensed moisture, or frost, and it is particularly beneficial to delay initiation of operation until the panel has warmed up and removed the moisture. Accordingly, each embodiment of this invention is advantageously provided with a temperature controlled valve interconnected into the fluid system to control liquid return to the evaporator. This valve is responsive to the solar panel's temperature and only opens when the panel temperature reaches a predetermined minimum value.

It is an important object of this invention to provide a self-contained heat transfer system utilizing a volatile fluid capable of transferring heat automatically from a heat source which is a solar energy powered panel to a heat sink located at an elevation either above or below that of the panel and to then return the fluid in a liquid state to the solar panel by gravity or by selective control of internally generated fluid pressure.

Another important objective of this invention is providing a self-contained heat transfer system utilizing a volatile fluid as a heat transfer medium and having the capability for returning liquified fluid from a heat sink to a heat source where it is again vaporized and which also includes temperature control which automatically functions to limit heat transfer and prevent the heat sink from exceeding a predetermined maximum temperature.

It is a further important objective of this invention to provide a self-contained heat transfer system which is operable to maintain circulation of a heat transfer fluid between a heat source and a heat sink which is at a relatively lower elevation than the heat source and which is also effective in maintenance of a flow of liquified fluid from the heat sink without regard to the relative ambient temperature and having enhanced efficiency through further extraction of heat by the heat sink in aiding in effecting a flow of liquified fluid.

The above and still further features, objects and advantages of the present invention will become apparent upon consideration of the following detailed description of a specific embodiment thereof. Reference will be had to the accompanying drawings which illustrate embodiments of the invention.

DESCRIPTION OF THE DRAWING FIGURES

DETAILED DESCRIPTION OF ILLUSTRATIVE EMBODIMENTS

Figure 1:
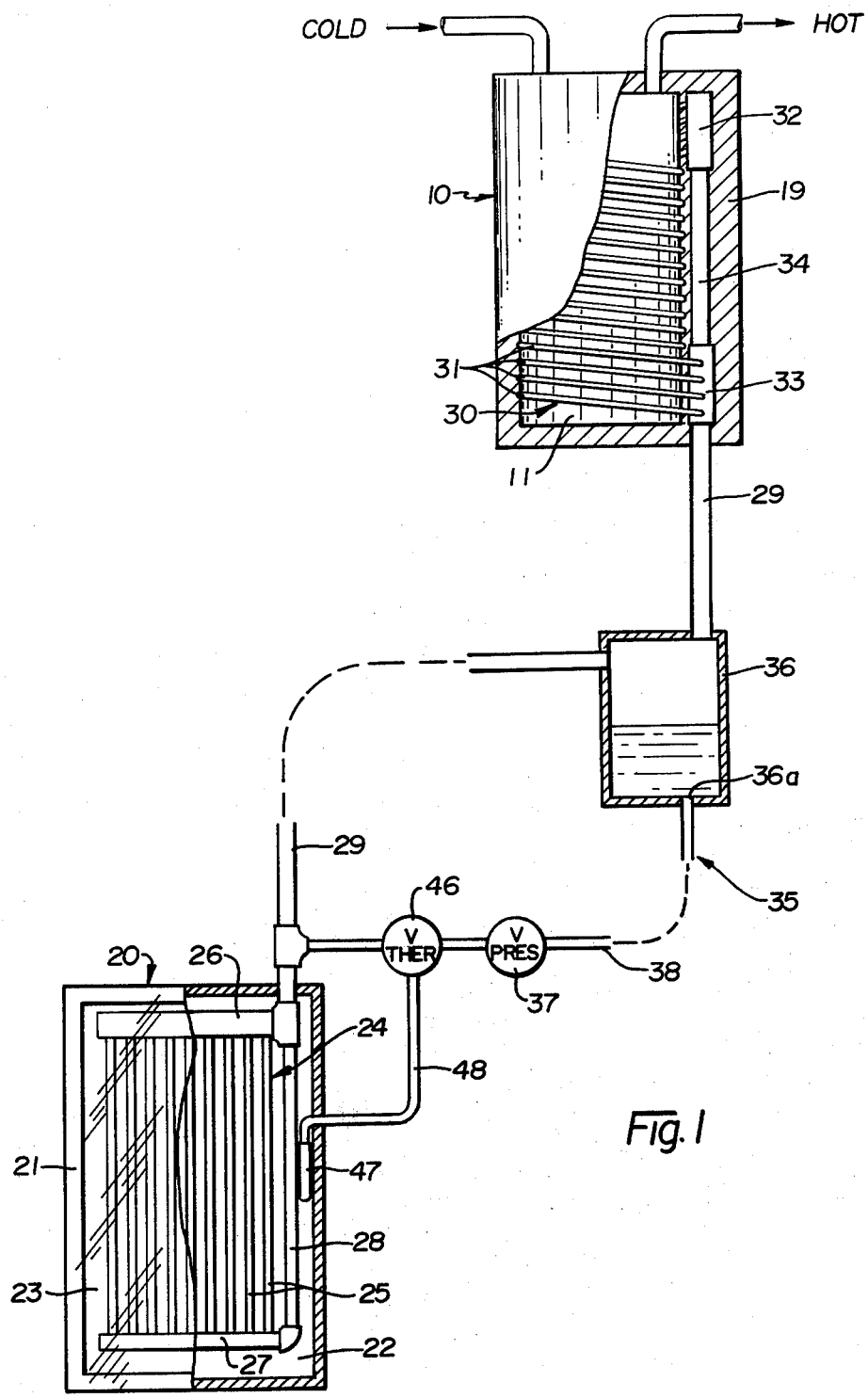
FIG. 1 is a schematic diagram of a heat transfer system embodying this invention and utilizing a gravity return.

Having reference to FIG. 1, a heat transfer system is schmatically shown that incorporates concepts of this invention. The specifically illustrated embodiment is designed to utilize solar energy as the heat source for a solar panel in effecting a transfer of heat to a utilization device. For purposes of illustration, the utilization device indicated generally at 10 comprises a cylindrical tank 11 adapted to receive and contain a liquid such as water. Appropriate fluid conduits 12 and 13 are shown connecting with the tank 11 and are adapted to be interconnected in a water system such as that which may be found in residential households. In that situation, the one conduit 12 would be connected to a source of pressurized cold water such as the city water system and has the interior end thereof, not shown, extending toward the bottom of the tank 11 in the customary manner. The opposite conduit 13 is also coupled with the tank 11 at its upper end and is interconnected in the water system of the residence for supplying of hot water.

Figure 2:
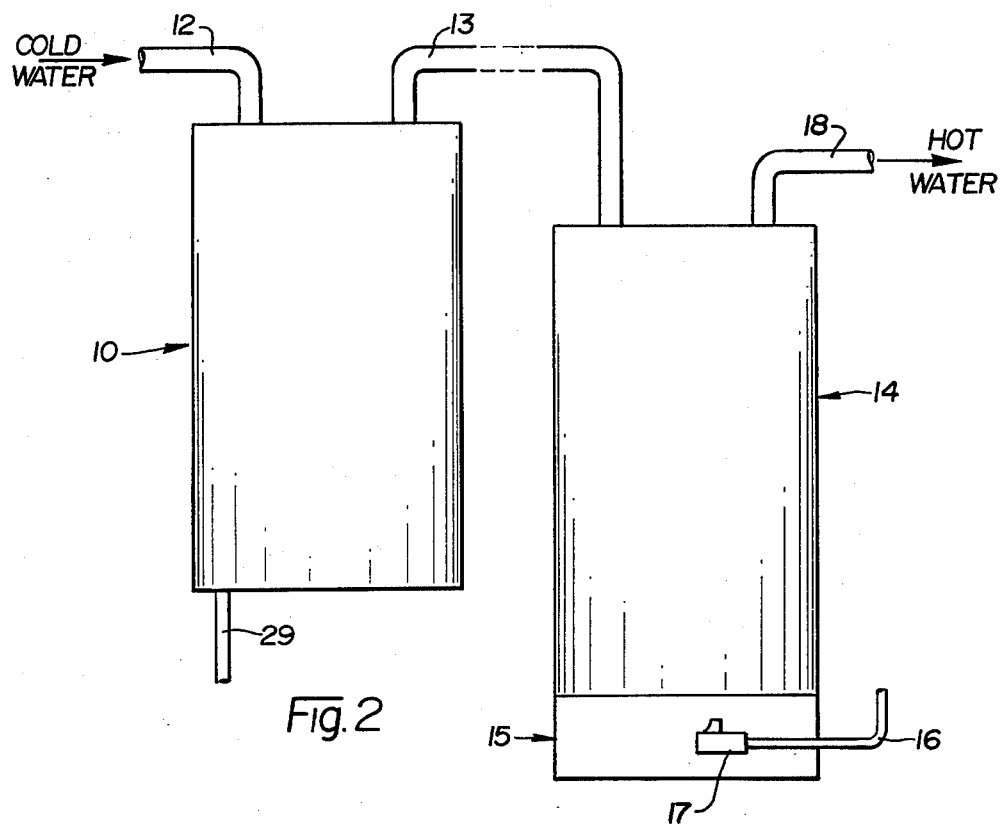
FIG. 2 is a diagrammatic illustration of the incoporation of the heat sink of the heat transfer system illustrated in FIG. 1 with an ultimate utilization heat system.

To further illustrate an exemplary utilization of the heat that may be obtained through utilization of the inventive heat transfer system shown in FIG. 1, reference may be had to FIG. 2. In that Figure, the primary heat utilization device 10 is shown interconnected in series relationship to a conventional water heater 14, which includes a tank of suitable capacity and provided with a heat source 15 which may be of either the well known gas or oil type or an electric type heating element. The specific heat source 15 that is provided with the conventional water heater 14 is dependent on the particular installation and does not form a part of the invention. However, for purposes of illustration, the heat source 15 is diagrammatically illustrated as being of the type having a burner adapted to utilize natural gas that is routed through an inlet conduit 16 and a control valve 17. The control valve 17 incorporates suitable temperature responsive means to maintain the water within the tank at the minimum acceptable temperature. Functional operation of a conventional water heater is well known and need not be further explained. Interconnection of the conventional water heater 14 includes an inlet conduit which is coupled to the outlet conduit 13 that is routing water from the utilization device 10. Complete interconnection of the system into the residential hot water system is made by a connecting conduit 18 which is connected to the upper part of the tank of the conventional water heater 14.

The complete utilization system as shown in FIG. 2 is considered of exemplary form in that a solar powered system of this type has limited residual heat storing capacity or means and thus, for a water heating system, must include auxiliary heat producing means to assure providing water at the minimum acceptable temperature. The reason for this is that there may be long periods of time during which solar energy is essentially non-existent, or when insufficient solar energy is available to provide the required water heating and thus the conventional water heater 14 functions and acts as the water heating source. Although the tank 11 and conventional water heater 14 have exterior, thermal insulation sheathings, such as that designated 19 with respect to the tank 11, this only increases the ability of the tank 11 to maintain the water at the last attained temperature and decrease heat loss. Thus, the conventional heater 14 will be utilized when some of the hot water is used and solar energy is either not available or insufficient to meet requirements.

Referring again to FIG. 1, it will be seen that a solar heating panel 20 is only shown in diagrammatic form as the specifics of the mechanical construction thereof do not form a part of this invention. In general the solar heating panel 20 comprises a structural supporting frame 21 having a back closure panel 22 and a glass face panel 23. The face panel 23 may be fabricated from other materials but generally having the characteristic of transmitting solar radiation to the interior of the panel where it may be utilized in generation of heat in a heat transmitting medium. In conventional solar panels employing present construction techniques, the back panel 22 may be formed from a heat reflective material and provided with an insulating layer on the opposite side for enhancing the efficiency of the unit.

In the particular heat transfer system of this invention, a volatile fluid is utilized as the heat transferring medium and thus a closed conduit system is provided for containing that fluid. In the solar heating panel 20 is an evaporator 24 constructed as a series of relatively small tubes 25 which are interconnected in fluid communicating relationship with respective upper and lower header pipes 26 and 27. A header connector pipe 28 is also provided and connected in fluid communicating relationship as between the upper and lower header pipes 25 and 26. The heat transfer system of this embodiment is generally described as being of the single-tube gravity return type and thus only one conduit connection is provided to the evaporator 24 within the solar panel 20. Transfer of the volatile fluid is by a single conduit designated in FIG. 1 by the numeral 29 and which connects with upper evaporator header pipe 26 and functions to permit a flow of vaporized fluid from the evaporator as well as a return of liquified fluid to the evaporator.

The heat transfer conduit 29 extends from the upper end of the conduit system within the solar panel 20, and, to achieve the gravity return of liquid to the solar panel, this conduit does extend upwardly for interconnection with the heat utilization device 10 that must necessarily be placed at a relatively elevated position with respect to a solar panel. Thus, in a typical installation the solar panel 20 will be positioned exteriorally of the residence structure where it can receive solar energy with the heat utilization device 10 positioned within the upper portions of the attic space, or in another suitable part of that residence but above the solar panel. In the usual type residence, the roof is of a sloped type and this forms an attic space sufficient for the purposes of housing the utilization device 10. While the primary heat utilization device 10 must be mounted vertically above the solar heating panel, the conventional water heater 14 as shown in FIG. 2 may be located in other portions of the residence. The city water system is pressurized and thus provides the necessary means for transferring water as between the respective tank 11 of the primary utilization device and that of the conventional water heater 14.

The volatile fluid utilized as the heat transferring medium in the inventive system is vaporized in the evaporator 24 and will flow out of the evaporator through the transfer conduit 29 to a condenser 30 disposed in heat transferring relationship to the tank 11 of the heat utilization device 10. This condenser in the illustrated embodiment comprises a plurality of relatively small diameter tubes 31 which are shown as helically wound around the exterior of the tank 11 which is cylindrical and disposed in an upright position. Four such tubes 31 are illustrated and these tubes are disposed in spaced apart relationship to each other and may advantageously be rigidly secured to the exterior of the tank by either brazing or soldering for enhanced heat conduction. The upper ends of each of the four tubes 31 are connected to a manifold 32 with the lowermost ends connected with a manifold 33. The conduit interconnects with the lowermost portion of the lower manifold 33 to permit a downward outflow of the liquified fluid that is condensed within the condensor 30. The two manifolds 32 and 33 are interconnected by a coupling conduit 34 to assure a return liquid flow from all components and avoid any counterflowing fluid interference that would otherwise occur in the relatively small diameter tubes 31. It will also be noted that the small tubes 31 are helically wound in an upward direction to thus provide a gravity-flow path back to the lower manifold 33 where the condensed fluid is collected and may freely flow downwardly through the transfer conduit 29. The specific constructional features of the condensor 30 are deemed to be exemplary for purposes of illustrating the components and functioning of the heat transfer system of this invention. It is to be understood that other forms and types of condensers may be utilized along with other types and forms of heat utilization devices without departing from the spirit and scope of this invention. Similarly, other types and forms of evaporators 24 in a solar heating panel may also be utilized. Furthermore, it will be apparent that a heating source other than a solar panel may be utilized to effect vaporization of the volatile fluid within a suitable and appropriate evaporator 24.

In this heat transfer system, means are provided for controlling the temperature of the water within the heat utilization device 10. This control of the heat is considered to be an important aspect of the invention to make it a practical apparatus for functioning in the illustrative application of heating water in a residential household. The water in a residence is not designed or intended to be heated to a temperature greatly in excess of 180°. In fact, for some households, the temperature of the hot water may be maintained within the range of 140° to 160° Fahrenheit for proper functioning and utilization in either washing machines or in dishwashers or similar types of devices. Accordingly, since it is an important objective of this invention to provide a self-contained heat transfer system which does not require any external control functions or apparatus to prevent the heat sink from exceeding a predetermined maximum desired temperature, a temperature controlling apparatus is incorporated in the system. This temperature controlling apparatus is designated generally by the numeral 35 and is operatively interconnected into the transfer conduit 29. While control of the maximum temperature of the water in the tank 11 is the objective, it will be understood that this control is only effective at those times when the heat transfer system is functioning and the evaporator 24 is receiving heat for effecting the operation. In the event that the solar heating panel 20 is non-functioning due to the particular prevailing solar conditions, then it will be understood that the temperature of the water in the household system will not be controlled by the apparatus 35 since the heating effect, if required, will be obtained through the conventional water heater 14. That heater, as previously indicated, is provided with its own internal temperature control means.

The temperature control apparatus 35 comprises an accumulator tank 36 and a pressure responsive valve 37. A liquid return conduit 38 connects the valve 37 to an outlet port 36a formed in the bottom of the accumulator tank and to the transfer conduit 29 whereby liquid may flow from the accumulator tank to the evaporator 24 via the conduits 38 and 29 when the valve 37 is open. Vapor flowing upwardly from the evaporator 24 through transfer conduit 29 also flows through the accumulator tank 36 which has its upper end interconnected in that conduit. Condensed fluid returning downwardly from the lower manifold 33 through the upper portion of the transfer conduit will thus flow into the accumulator tank where it will be retained if the valve 37 is closed.

As previously indicated, the heat transfer system has a temperature control apparatus 35 to maintain the temperature of the water in the tank 11 of the utilization device at or below a predetermined maximum temperature. While a direct temperature sensing mechanism could be utilized, it is preferred in the illustrative embodiment to use a pressure responsive mechanism for effecting this control. The pressure within the closed conduit system is proportionately related to the temperature that is attained by the respective fluids and is thus responsive to the temperature of the water in the tank 11. Operationally, when the temperature of the water is below the predetermined maximum, the fluid pressure in the system will also be below a maximum operating pressure of the valve 37. The valve 37 will then be open and permit a return flow of liquid to the evaporator. When the temperature of the water in the tank 11 attains the maximum desired temperature the pressure of the fluid in the system will have reached the upper operating point and cause the valve 37 to close for the purposes as will be further explained. When the temperature of the water has decreased to a temperature below the maximum desired, and the fluid pressure has correspondingly decreased to a lower operating point, the valve 37 will be caused to open.

Figure 3:
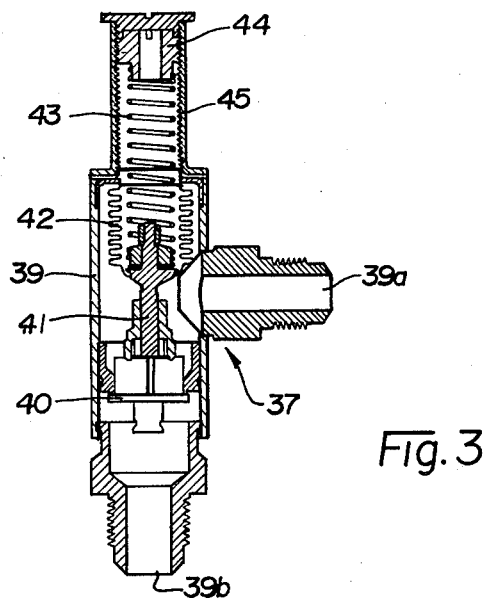
FIG. 3 is a diagrammatic sectional view of a pressure responsive valve.

A specific exemplary pressure responsive valve 37 is shown in detail in FIG. 3. Such a valve is commercially available and comprises a housing 39 provided with respective inlet and outlet conduit connections 39a, 39b and including a valve element 40 which operates relative to a valve seat. An actuating stem 41 attached to a valve element 40 is connected to one end of an axially aligned expandable bellows 42 which has its opposite end secured to the valve housing 39. A biasing spring 43 extends axially into the bellows 42 and bears against the end thereof to which the actuating stem 41 is attached to thereby provide a biasing force that urges the valve element 40 to a closed position against the associated valve seat. Adjustability of the valve's operating pressure points is obtained by an adjusting plug 44 which is threaded into an extension 45 of the housing that receives an end portion of the spring 43. The end of the spring 43 bears against the plug 44 which may be selectively positioned within the threaded housing extension 45 to obtain opening and closing of the valve at desired lower and upper operating pressures.

Further control over return of liquid to the evaporator 24 through conduit 38 from the accumulator tank 36 is obtained by a thermostatically controlled valve 46 also interposed in that conduit. This valve is preferably designed to be rapid acting, particularly upon opening, and the valve is designed to open at a control temperature somewhat above the temperature at which it will close. Specifics of an exemplary valve will be further described with reference to an illustrative embodiment shown in FIG. 6. However, this valve 46 is designed to be actuated by fluid pressure and for obtaining the actuating pressure, a pressure bulb 47 is provided and is connected to the valve's operating mechanism by a conduit 48. The bulb 47 is positioned within the solar panel 20 and the valve is thus responsive to the temperature developed within the panel structure.

Operation and functioning of the heat transfer system as illustrated in FIG. 1 can be best understood by first assuming the temperature of the water in the tank 11 of the utilization device 10 is below that which is the maximum desired available temperature. In that situation the accumulator tank 36 would not be retaining any liquified fluid therein as illustrated in FIG. 1 since the pressure responsive valve 37 would have functioned in response to the pressure/temperature of the fluids to cause the valve element 40 to be displaced to an open position. In this operating configuration, fluid as it is condensed in the condenser 30 will flow downwardly through the conduit 29 and into the accumulator tank 36. The fluid in a liquid state discharges through the outlet port 36a where it is returned through conduit 38 to the conduit 29 and into the evaporator 24 for subsequent vaporization. This operation is based on the further assumption that the temperature in the solar panel 20 had attained the opening point temperature of the thermostatic valve 46 and resulted in placing that valve in an open condition.

As the system continues operation in transferring of heat from the solar heating panel 20 to the utilization device, the temperature of the water in the tank 11 will rise. When the temperature of that water approaches and ultimately reaches the maximum desired temperature, the pressure within the conduits and the accumulator tank 36 will correspondingly rise and effect a compression of the flexible bellows 42. Compression of the bellows 42 in response to the increased internal pressure results in axial displacement of the valve actuating stem 41 and positioning of that valve element 40 in closing relationship to the valve seat. At this point, any liquified fluid that is returning through the conduit 29 to the accumulator tank 36 will then be retained and collected therein. This is illustrated in FIG. 1 by the level of the fluid indicated therein. The heat transfer system will continue operating to vaporize fluid in the evaporator 24 which is then routed to the condenser 30 and condensed to a liquid state. This procedure continues as to vaporization and collection of the condensed liquid in the accumulator tank until such time as there is essentially little fluid left in the evaporator 24. At that time, solar energy received by the panel 20 will not produce any further transfer of heat to the heat transfer fluid and there will be no further increase in the temperature of the water within the heat utilization device. Thus, it is essential that the accumulator tank 36 has a sufficient capacity to hold essentially all of the volatile fluid when in a liquid state and prevent its return to the evaporator 24. When essentially all of the volatile fluid is in a liquid state in the accumulator tank, the system will then be in a non-operating mode and will remain so until such time as the pressure drops below a predetermined point and permits liquified fluid to flow out of the accumulator tank 36 and into the evaporator 24. The system will then continue to function in the aforedescribed manner to effect a transfer of heat to the water in the tank 11 by conversion of solar energy received at the solar panel 20.

The function of the thermostatic valve 46 is to facilitate start-up of the system after it has not been operating for a period of time, such as overnight. Frequently, the solar panels face panel 23 will accumulate a layer of frost or condensed moisture which will significantly interfere with absorption of solar energy by the evaporator. Removal of the layer of frost can be enhanced if the system is prevented from operating until the solar panel has attained a predetermined minimum temperature. This deferral in system operation is accomplished by the thermostatic valve 46 which may be set to open only when the temperature in the solar panel exceeds a selected value of 140° F., for example. When the thermostatic valve 46 is closed, liquified fluid will be prevented from flowing back into the evaporator 24 and any liquid in the evaporator will be vaporized and ultimately collected in the accumulator tank 36. In this situation, solar energy that is received will then be solely utilized in raising the solar panel's temperature and thereby more rapidly aid in removing any accumulation of frost or moisture. Once the temperature of the solar panel exceeds the operating point of the thermostatic valve 46, that valve will open and system operation will then proceed as previously described.

The heat transfer system as is illustrated and disclosed in conjunction with FIG. 1 is thus seen to provide a self-contained and controlled system which does not require any outside control elements or apparatus. The power and energy for effecting the control is inherent in the fluid system and it is not necessary to provide any complex or complicated electrical controls or other valving mechanism. Additionally, there is no expenditure of energy to return condensed fluid in a liquid state to the evaporator for recycling and continuing the heat transfer function. The gravity flow eliminates any requirement for such auxiliary mechanisms and apparatus that would otherwise be associated with return of the condensed or liquified fluid to the evaporator from the condenser 30.

Figure 4:
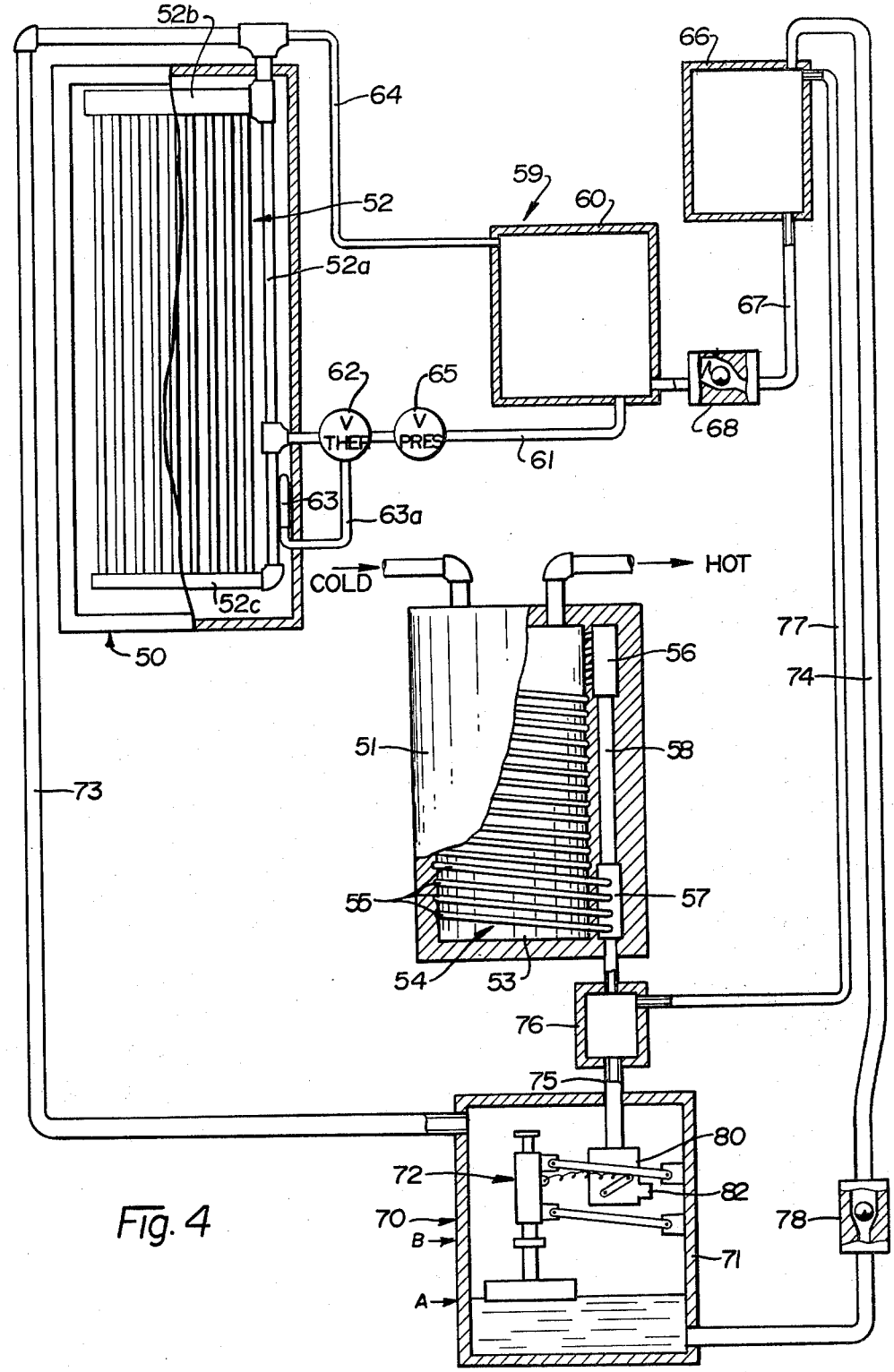
FIG. 4 is a schematic diagram of a modification of a heat transfer system embodying this invention and utilizing a pressure liquid return.

While the gravity return system as shown in FIG. 1 provides a system which does incorporate the essential and important temperature control as to the heat utilization device, it is often more convenient to have the heat utilization device located at a lower elevation than the heat source or solar heating panel. However, locating the heat utilization device 10 at a lower elevation then requires providing of means for effecting a return of liquified fluid from the heat sink to the evaporator. A heat transfer system incorporating the features of this system and the added mechanism for effecting the return of the liquified fluid is illustrated in FIG. 4. That illustrated system includes a heat source which again is in the form of a solar heating panel 50 and a heat utilization device or heat sink 51. The structural arrangement of the solar heating panel 50 is essentially similar to that previously described in the embodiment shown in FIG. 1 and includes a volatile fluid evaporator 52, it again being understood other solar panel constructions using volatile fluids may be substituted in a specific installation. The heat sink 51 is also of a similar construction to that previously described and includes a tank 53 for receiving the water to be heated and a volatile fluid condenser 54. This condenser 54 includes a plurality of small tubes 55 that are connected at their upper ends to a manifold 56 and have their lower ends interconnected into a manifold 57 with a coupling conduit 58 interconnecting the two manifolds.

The system illustrated in FIG. 4 also includes temperature control apparatus indicated generally by the numeral 59. This temperature control apparatus 59 includes an accumulator tank 60 having an outlet port at its lower end connected by a liquid return conduit 61 to a header connector pipe 52a coupling the upper and lower headers 52b and 52c. It will be noted at this point that in an actual physical installation, and as is diagrammatically illustrated, the accumulator tank 60 is preferably positioned at a relatively elevated position with respect to the evaporator 52, such as having its bottom at about the mid-point of the panel, so that a return of liquified fluid will be assured. A thermostatic valve 62 is also interposed in the return liquid conduit 60 to provide the deferred start-up as with the FIG. 1 embodiment. Thus thermostatic valve 62 is controlled by a temperature responding pressure bulb 63 located within the solar panel 50 and connected with the actuating mechanism of the valve by a tube 63a. A vent pipe 64 is also provided for the accumulator tank 60 and interconnects between the top of the tank and the top of the evaporator 52 such as at an exterior outlet connection to the header connector pipe 52. A pressure responsive valve 65 similar to that provided and described in conjunction with the FIG. 1 embodiment is included in the conduit 61 to control the flow of liquid from the accumulator tank 60 to the evaporator. This valve 65 functions in the same manner as that described in the system illustrated in FIG. 1.

A liquid holding tank 66 is also provided to receive the liquified fluid during a liquid return or transfer operation, as will be further described, while the accumulator tank 60 continues to supply liquid to the evaporator to assure that the transfer operation is accomplished. This holding tank is positioned in relatively elevated relationship to the accumulator tank 60 and has an outlet port in the bottom thereof connected by a conduit 67 to the bottom of the accumulator tank. Interposed in the conduit 67 is check valve 68 which is oriented to permit free flow of liquid to the accumulator tank. This check valve may be of the spring biased type to assure return of its valve element to a closed position. The valve is selected to have a spring biasing force such that the liquid head developed because of the elevated position of the holding tank will assure opening of the valve. At the conclusion of the transfer operation, the pressure difference between the accumulator tank 60 and the holding tank 66 will be equalized, thereby permitting the check valve 68 to open and allow liquid to flow from the holding tank to the accumulator tank. Availability of liquid in the accumulator tank 60 at the conclusion of, or termination of a transfer operation for any other reason, will assure that the system will start-up after overnight cooling.

In this form of the heat transfer system, means must be provided for return of the volatile fluid after it is condensed in the condenser 54 to the relatively elevated accumulator tank 60 and holding tank 66 and ultimately to the evaporator 52 in the solar heating panel. This fluid return means, designated generally by the numeral 70, is interconnected in conduit means that couple the various components in fluid communicating relationship. Fluid return means 70 includes a collector tank 71 and a float actuated valve mechanism 72. The conduit means providing the fluid interconnection of the several components includes a vapor conduit 73 having its one end connected with the solar panel at the outlet connection of the evaporator 52 and its lower end opening into the collector tank 71. A liquid fluid return conduit 74 connects to the collector tank 71 at its bottom region and extends upwardly to enter the holding tank 66 at its upper end. Interconnecting the collector tank 71 with manifold 57 of the condenser is a vapor and liquid conduit 75. This conduit 75 extends into the interior of the collector tank 71 and has interposed therein the relatively smaller tank 76 which functions as a liquid and vapor separator as will be described hereinafter. It will be seen in FIG. 4 that the collector tank 71 is disposed at a relatively lower elevation than the manifold 57 of the condenser thereby enabling condensed liquid fluid to flow by gravity from the manifold and into the collector tank. Completing the conduit means interconnecting the several components is a vent conduit 77 which connects into the upper end region of the separater tank 76 and also connects at the upper end region of the holding tank 66. This interconnection at the upper ends of the respective tanks is necessary to prevent having liquified fluid enter the vent conduit 77 and inhibit or prevent proper operation of the system as will be further explained. It will also be seen in FIG. 4 that a check valve 78 is interposed in the liquid return conduit 74 and is located at its lower end adjacent the collector tank 71. This check valve is oriented to prevent a reverse flow of liquid from the conduit 74 to the tank 71 so that liquid filling the return conduit cannot, at the end of a liquid return operation, return to the collector tank 71 and perhaps reinitiate another return operation. Preventing of such cyclic operation is an important aspect in providing of an efficiently operating system.

The float actuated valve mechanism 72 included in the collector tank 71 comprises a valve 80 and a float actuating mechanism 81. Functioning of the system to effect a return of liquid to the accumulator and holding tanks 60, 66 and evaporator 52 is dependent initially upon the collection of a predetermined quantity of liquid within the collector tank 71. This liquid is obtained through condensation in the condenser 54 and the return of that liquid through the conduit 75 and the valve 80. The valve 80 is of a type which may be selectively actuated to either an open or closed position and has a discharge orifice 82 through which liquid exits the valve and enters the collector tank 71. The same orifice also functions as an entrance for vapor to pass upwardly through the conduit 75 and into the condenser.

Figure 5:
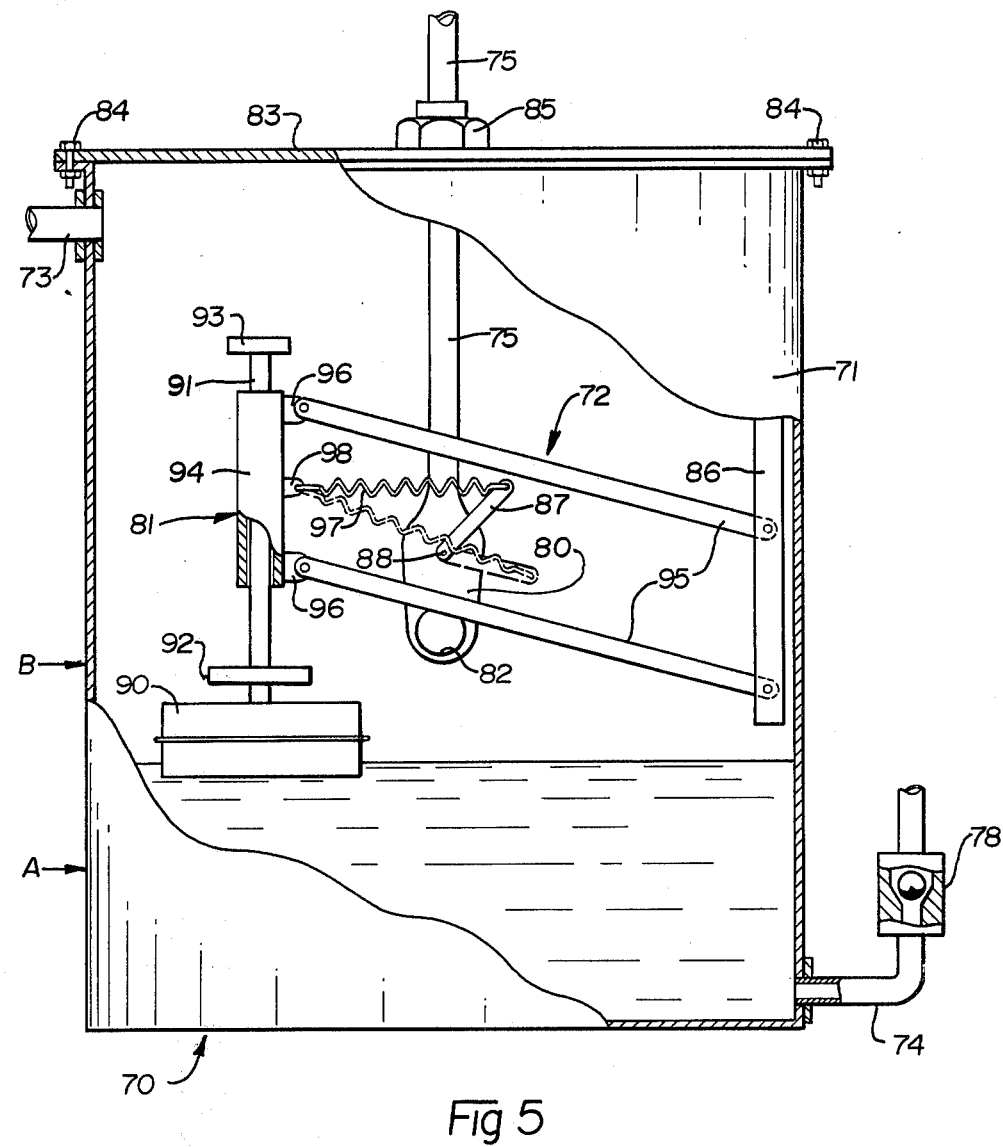
FIG. 5 is an enlarged diagrammatic illustration of a component providing the pressure liquid return in the system of FIG. 4.

The specifics of the construction of an illustrative embodiment of the fluid return means 70 can be better seen in FIG. 5. This figure is a substantial enlargement of the fluid return means 70 and it will be seen that the collector tank 71 is provided with a removable cover plate 83. This cover plate 83 is shown as being secured in fluid sealing relationship by means of bolts 84. Projecting through the cover plate 83 is the conduit 75 which couples with the condenser. This conduit 75 is provided with a fluid seal 85 to maintain the sealed relationship of the system. Also carried by the cover plate 83 is the float actuating mechanism 81 which is supported on a depending bracket 86. Attached to the inner end of the conduit 75 is the valve 80 which is positioned at an elevation within the collector tank 71 to be effectively operated by the float actuating mechanism 81 in accordance with the predetermined fluid levels for the intended operational sequence. In particular, this operational sequence requires that the valve 80 be actuated to an open position when the upper level of the liquified fluid is at or below a predetermined level. Operation of that valve 80 to a closed position is then effected when the level of the liquified fluid reaches a second predetermined level that is substantially higher than the first. This results in a cyclic operation that is determined by the rate at which liquid is collected in the tank 71 and caused fluctuation between the two predetermined levels indicated at A and B in FIGS. 4 and 5.

A particularly suitable type of valve 80 for the operation of such a system is a butterfly or gate type valve which has a valve element mounted for pivoting movement between internally constructed ports and passages in the valve body. The particular construction of the valve is well known and is not otherwise described. A reason for using such a valve is that it requires relatively little force to operate and is not significantly affected by the internal fluid pressures which are developed within the closed system. Operation of the internal valve elements is affected by an operating handle or lever 87 that is mounted on an externally projecting horizontal shaft 88. It will be understood that the movable valve element located in the interior of the valve body is mechanically coupled with that shaft 88. Thus, with this physical positioning of the valve element by an operating lever, it will be seen that movement of the lever in a vertical plane between the positions shown in broken and full lines in FIG. 5 will effect operation of the valve between closed and open positions.

Providing the necessary mechanical force for swinging the valve lever 87 between its two positions is the float actuating mechanism 81. This float actuating mechanism includes a float 90 having an upwardly projecting operating rod 91. Secured to the operating rod 91 in axially spaced relationship are lower and upper stop collars 92 and 93. Maintaining the float 90 and its operating rod 91 in the desired operating or vertical position is a parallelogram linkage and guide tube 94. The parallelogram linkage includes a pair of elongated arms 95 that are pivotably secured at respective ends to the guide tube 94 by brackets 96. The opposite end of each linkage arm 95 is pivotally attached to the depending bracket 86. Coupling of the float actuating mechanism 81 to the operating lever 87 of the valve 80 is effected by an elongated helical coil spring 97. One end of the spring 97 is seucred by an attachment bracket 98 to the guide tube 94. The opposite end of the spring is connected to the free end of the valve operating lever 87.

Functioning of the float actuated valve mechanism 72 requires a change in the level of the liquid contained within the collecter tank 71. In FIG. 5, the surface of the liquid is shown as being above a predetermined minimum level A but lower than that of a maximum level B. In this condition, the valve 80 will have been previously actuated to place its internal valve element in a closed position with the operating lever 87 disposed as illustrated in full lines. When thus positioned, there will be no fluid flow in either a vapor or liquid form through the valve and the internal pressure within the system, specifically the collecter tank, will increase to force the collected liquid out of the bottom of the tank and through its liquid conduit 74 to the accumulator and holding tanks 60, 66. This operation will be described in further detail hereinafter; however, as that liquid is forced out of the collecter tank 71, the float 90 will descend following the surface level of the liquid and ultimately cause the upper stop collar 93 to contactingly engage the upper end of the guide tube 94. Further decrease in the liquid and lowering of its surface level will result in the weight of the float 90 and its associated components causing the parallelogram linkage arms 95 to swing downwardly and concurrently displace the attachment bracket 98 downwardly. When the surface level of liquid has descreased to the predetermined level where the spring 97 will pass the operating shaft 88, it will then function to swing the operating lever 87 to the broken line position in the manner of on over center, toggle linkage. At this point, the valve 80 will then be open and permit vapor to flow upwardly through the conduit 75 to the condenser 54 and the resultant liquid may then flow downwardly and into the collecter tank 71.

With the valve 80 open, the pressure in the system will equalize, as will be explained in greater detail, and no more liquid will be forced out of the collecter tank 71 through the conduit 74. However, liquid will again accumulate in the tank 71 through the condensation process and the level will rise thereby causing the float 90 to move upwardly. When the level of liquid has increased to a point where the lower stop collar 92 engages the bottom end of the guide tube 94, further increase in the quantity of liquid collected in the tank 71 will cause the float 90 to move upwardly and swing the parallelogram linkage arms 95 in an upward direction. This also causes upward displacement of the spring attachment bracket 98 and when the spring 97 again passes the valve actuating shaft 88, it will be effective to swing the operating lever 87 from the broken line position to the full line position and again close the valve 80. When the valve 80 is closed, the liquid removing operation with respect to the tank 71 will again proceed as previously described.

Although not structurally indicated in the drawing figures, except with respect to the heat sink 51, all conduits and components in the system other than the solar panel 50 are preferably provided with a thermally insulating sheathing. This is important with respect to the conduit 73 and collector tank 71 to prevent heat loss which would decrease system efficiency. It is also important as to other components, even though located in the interior of the building, to reduce heat loss.

Having thus described the components forming the system as shown in FIG. 4 and having specifically described the structure and operation of the fluid return means 70, it is believed that the complete system operation may be better understood by means of an example of a typical operation. Accordingly, the system will be considered from the standpoint of being in a heat transfer mode wherein the valve 80 is in an open position. For purposes of describing operation in returning liquid to the holding and accumulator tanks 66 and 60, it will also be noted that the thermostatic valve 62 is open since the solar panel is assumed to be at or above the minimum desired operating temperature. It is further assumed that the pressure in the conduits is less than that related to the maximum desired temperature of the heat sink 51 and that the pressure responsive valve 65 is in an open position. It is also assumed that there is sufficient liquified fluid in the evaporator 52, and in the accumulator tank 60 in certain operating instances. In this mode of operation, and further assuming that there is an effectively available heat source in that solar energy is available for functioning of the evaporator 52, the volatile fluid contained in the evaporator will be vaporized and flow through the conduit 73 and into the collector tank 71. After entering the collector tank, the vaporized fluid will continue and exit through the valve 80 whereupon it will flow upwardly through conduit 75 into the condenser 54. While the vent conduit 77 forms an open connection between the separator tank 76 and the holding tank 66, there will not be any significant vapor flow since the holding tank 66 and accumulator tank 60 will have a quantity of liquid which forms a vapor trap and prevents any significant flow of vapor in the vent conduit. If vapor condenses in the vent conduit 77, it will flow downwardly and into the collector tank 71.

As the heat utilization device 51 continues to absorb the heat that is being transferred, the condenser 54 will continue to condense the vapor into a liquid state which then flows downwardly through the manifold 57 and conduit 75 and into the the collector tank 71. As the quantity of liquid increases, there will be an increase in the liquid level in the collector tank 71, the float 90 will move upwardly and, when it reaches the predetermined maximum level B, it will cause operation of the valve mechanism 72 as previously described to close the valve 80 and result in an increase in the pressure within the collector tank 71. That increase in pressure results from continued operation of the evaporator 52 in vaporizing the volatile fluid. Check valve 68 interposed in conduit 67 prevents a reverse flow in the system even though there will be an increase in pressure in the accumulator tank 60. Thus, the pressure will continue to increase in the collector tank 71 to the point where it exceeds the pressure head developed by the vertical height of the liquid conduit 74 and will then discharge the liquid through the bottom of the collector tank 71, check valve 78, upwardly through conduit 74 and into the holding tank 66. Liquid will be retained in the holding tank 66 during a liquid return operation as the vapor pressure generated in the evaporator 52 will be present in the accumulator tank 60 and will maintain the check valve 68 in a closed position.

Pressure in the evaporator portion of the system must be greater than the pressure in the holding tank 66, otherwise it will be impossible to return liquid to the holding tank 66. In the system of this invention, a lower pressure in the holding tank is assured regardless of external ambient temperature conditions because of the vent conduit 77 which interconnects with the condenser 54. Vapor in the vent conduit and holding tank in communication with the condenser will result in continued condensation of that vapor through continued transfer of heat into the heat sink 51. Consequently, while the vapor trapped in the holding tank 66, vent conduit 77 and condenser 54 may tend to temporarily inhibit a flow of liquid into the holding tank from the liquid return conduit, the degree of inhibition being dependent on the relative magnitude of pressures in the system, that vapor will continue to condense in the condenser and thus continue to reduce the pressure in the holding tank. With continued decrease in pressure in the tank 66, and/or increase in pressure in collector tank 71 so as to result in a pressure imbalance, liquid can be returned to the holding tank and permit the quantity of liquid in the collector tank 71 to decrease until the liquid level decreases to the lower level A where the float actuated valve mechanism will operate and open valve 80. Condensed liquid that has been retained in conduit 75 and the separator tank 76 as a consequence of the valve 80 being closed, will now return to the collector tank 71. The system will then continue to function in a heat transfer mode until either the quantity of liquid in the collector tank again increases to a predetermined maximum level B thus initiating another liquid return operation, or enter a different operating mode.

The interconnection of the holding tank 66 and condenser 54 through the vent conduit is an important and advantageous feature of this system since condensation of vapor trapped in the holding tank is essential to reduce the pressure in this portion of the system to thereby enable liquid to be returned to that tank. Failure to decrease in the holding tank 66 during a liquid return operation, and that pressure would increase in proportion to the amount of liquid discharged therein, would result in that pressure opposing the pressure developed by the evaporator 52. The resultant effect would be to slow return of liquid to the holding tank. There is another important objective achieved by this system in that the heat loss required to condense the vapor trapped in the holding tank 66 is effected in the condenser 54 and results in a useful transfer of heat to the heat sink. This represents an increase in the systems efficiency. A still further important objective achieved by this system is that return of liquid is not dependent on external ambient temperature conditions. The return of liquid is only dependent on internal system conditions and those conditions are such that the heat sink 51 will effect a condensation of vapor regardless of the relative temperatures.

Operation of the system will continue in the manner described to provide heat to the heat sink although periodically slowed by liquid return operations. Assuming that the solar energy available is effective to meet the heat sink requirements, the temperature of the heat sink will ultimately reach its maximum desired magnitude. When that temperature is reached, the pressure within the system will also have increased in proportional relationship and effect operation of the pressure responsive valve 65. Closing of the valve 65 will prevent further return of liquid from the accumulator tank 60 to the evaporator 52. In the absence of a continued liquid supply, the evaporator will soon cease to be effective and the system will terminate its heat transfer function. Heat transfer will again resume when the temperature of the heat sink 51 has dropped sufficiently so that the pressure responsive valve 65 functions to open and again permit liquid to flow from the accumulator tank 60 and into the evaporator 52. Resumption of heat transfer is predicated on sufficient solar energy being available at that time to effect vaporization of the liquid.

During the time that heat transfer is being terminated, it is immaterial in what stage the fluid return means 70 may be functioning. If the valve 80 is open and the supply of vapor effectively ceases, then the quantity of liquid in the collector tank 71 will remain at the level last attained by the liquid which is condensed during termination of heat transfer. If the quantity of liquid in the collector tank should exceed the predetermined maximum level, the float actuated valve mechanism 72 will function and close the valve 80. With the valve 80 closed, liquid will be returned to the holding tank 66, provided the pressure developed by the evaporator is sufficient to overcome the liquid head pressure of the liquid return conduit 74. If that pressure is not sufficient, then heat transfer will terminate with the valve 80 closed and in readiness to continue with the liquid return operation when the heat transfer function is resumed.

One other operating situation that is of specific interest is that where the system of FIG. 4 has been inoperative for a substantial period of time and the several components will have become relatively cool. This is a common and recurring situation in that the system will not remain operating during the night with the effect thereof being significantly dependent upon ambient temperature and weather conditions. During warmer seasons, in the warmer climatic zones, ambient temperature and weather will have a materially lesser effect on the system as it attempts to restart a functional heat transfer operation. The collector tank 71 will be cool, or cold, and will require a substantial amount of heat to be provided and this is only accomplished through condensation of fluid that has been vaporized by the evaporator. Condensation of the vapor in the collector tank, or also in the heat sink condenser 54, to obtain this warm-up of components is only achieved at the expense of vaporizing any liquid that may be in the evaporator or which may be available in the accumulator tank 60 and/or in the holding tank 66. The problem encountered in startup is that the amount of liquid required to effect warm-up of the collector tank may exceed the amount contained in the evaporator 52 and the accumulator tank 60. The underlying basis for the existance of this problem is that the collector tank 71 must be heated to the temperature of the heat sink 51 before the system can be placed in operation because it is the collector tank that is effecting condensation of vapor and effecting closing of the valve 80. It is for this reason that the thermostatic valve 62 is provided in the inlet conduit 61 leading to the evaporator 52 and that a holding tank 66 is provided in combination with an accumulator tank 60.

In a typical startup situation, the temperature in the evaporator will be below the opening temperature of the thermostatic valve 62 and that valve will be closed thus preventing liquid from flowing out of the accumulator tank 60 and into the evaporator 52. Although the pressure responsive valve 65 will be open, liquid flow out of the accumulator tank will initially be prevented by the thermostatic valve until the temperature in the evaporator increases to the opening point of the thermostatic valve. Accordingly, even though the evaporator 52 will begin to function at an earlier time and vaporize liquid, liquid will not be supplied to make up for the liquid which has been vaporized until the panel reaches a temperature where it will be able to vaporize the liquid at a rapid rate. With the evaporator 52 effective to vaporize the liquid so as to develop sufficient pressure within the system, liquid may be returned to the holding tank 66 in accordance with the previously described liquid return operation. At that time, the system will have then completed a start-up operation and will continue to function in a heat transfer mode of operation such as that previously described.

During start-up under normally expected conditions, the liquid will be vaporized in the evaporator 52 at a sufficiently rapid rate such that the liquid contained in the evaporator and in the accumulator tank 60 will be sufficient to initiate a start-up operation. This will be particularly true if valve 80 in the collector tank 71 is closed. Even if the system had just reached the condition where a liquid transfer operation was to be initiated when, for some reason operation was terminated, the system would normally be enabled to start-up. There would be some liquid in the accumulator tank 60 and evaporator 52 which would be sufficient to vaporize and develop sufficient pressure to effect a transfer of liquid from the collector tank 71 to the holding tank 66. However, in the unlikely event that the available solar energy is inadequate to complete a liquid transfer operation, and the system remains in an essentially static condition with the liquid being slowly vaporized and perhaps condensing in the collector tank, it is even more unlikely that some liquid would not have been returned to the holding tank. When the system is thus operating, there will be some vapor pressure generated and that pressure will be effective in maintaining the check valve 68 closed thereby preventing liquid from flowing out of the holding tank 66. Consequently, even if nearly all available liquid is vaporized by the evaporator when solar energy ceases to be effectively available, the system will have the liquid in the holding tank 66 available when solar energy again becomes available. When the system completely shuts down, the pressure in the evaporator and accumulator tank will drop to the point where the check valve 68 will open thereby permitting liquid in the holding tank to flow into the accumulator tank where it will be available for a subsequent start-up operation.

It will be noted that during normal operation of the system, whether in a heat transfer mode, liquid transfer operation or start-up mode, pressure developed would not exceed the operating pressure point of the pressure valve 65 so as to cause that valve to close. In any of these instances, valve 65 would only close if the temperature of the heat sink 51 reached the maximum desired and caused the pressure valve 65 to close thereby discontinuing any operation then in progress.

Figure 6:
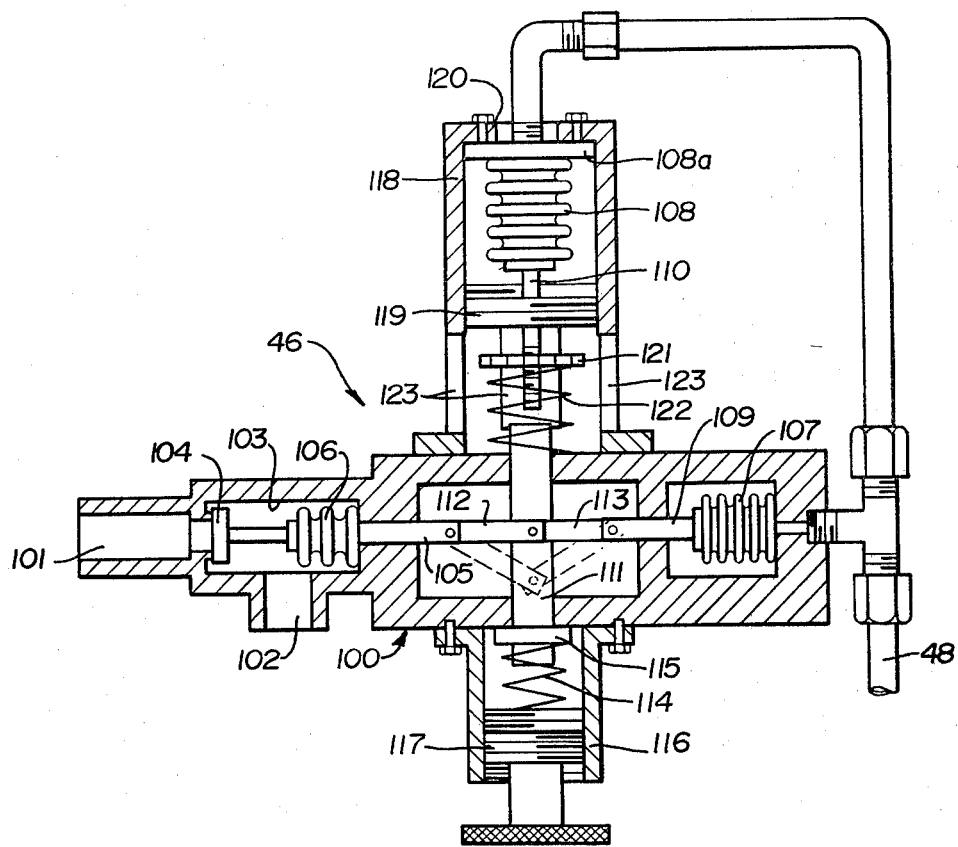
FIG. 6 is a diagrammatic sectional view of an illustrative embodiment of a thermostatic valve for use in the systems of FIG. 1 or FIG. 4.

An exemplary embodiment of a thermostatically controlled valve 46, as included in the system of FIG. 1, is shown in diagrammatic sectional detail in FIG. 6. This valve comprises a structure which has the desired characteristics of rapid opening operation at its upper operating temperature point and relatively quick closing operation at its lower operating temperature point. Preferably, the opening and closing temperature points are relatively widely separated, since, while a relatively high temperature in the solar panel is desired for the opening point to assure that any accumulated frost will have been dissipated prior to start-up, this is not a problem as temperature drops and the solar panel ceases to function in an effectively useful manner. Thus, closing of the valve can be delayed until the solar panel reaches a relatively low temperature thereby permitting continued operation for greater utilization of available solar energy. Also, while rapid operation from fully closed to fully open is desired, closing can be accomplished relatively slowly in the first stages with this embodiment of the valve, but relatively rapid completion of closing is desired and can be achieved with this valve. A substantially similar valve 62 is included in the FIG. 4 system where it is even more important to make a rapid start at a selected panel temperature.

This illustrative embodiment of the valve 46 comprises a structure which has the desired operating charateristic at its opening or closing temperature points. A housing 100 is provided and includes inlet and outlet connections 101, 102 enabling coupling of the valve into the conduit 38 or 61 of the respective systems. These inlet and outlet connections lead to and from a valve chamber 103 having a valve seat with which a valve element 104 cooperates in either permitting or preventing fluid flow through the chamber. An actuating stem 105 carries the valve element at its one end and is supported for reciprocating movement in a guideway formed in the housing with the opposite end projecting axially outward from that guideway. Fluid sealing of the actuating stem is achieved by a flexible bellows 106 which is particularly capable of forming an effective seal with respect to gaseous fluids.

Operation of the valve is effected by toggle mechanism that responds to a fluid pressure which is developed by the pressure bulb 47 (or 63) that is located in the solar panel. The pressure bulb 47 is filled with a fluid, such as a suitable refrigerant, that vaporizes in proportion to the ambient temperature and generates a gas which is contained in the bulb, its associated conduit 48 (or 63a) and other components interconnected therewith. The selected fluid has a characteristic such that vaporization is proportional to its temperature and thus the pressure that is developed will increase proportionally to an increase in temperature. The conduit 48 is connected in fluid communicating relationship with a pair of actuators 107 and 108 which are respectively termed opening and trigger actuators. Each actuator is illustrated as being of the flexible bellows type having respective actuating shafts 109 and 110.

Providing mechanical coupling of the actuators 107, 108 with the valve elements actuating stem 105 is a toggle-link mechanism having a shift rod 111 and a pair of toggle links 112 and 113. The shift rod is slideably mounted in guideways formed in the housing 100 for reciprocating movement along a path that is oriented transversely to the path of movement of the valve actuating stem and in spaced relationship to its end. Pivoted to the shift rod 111 and to the end of the valve actuating stem 105 and mechanically coupling those components is the one toggle link 112 which will effect displacement of the valve element 104 from its illustrated closed position to an open position as a consequence of displacement of the shift rod to a second position. This second position is indicated by the broken line position of the toggle links 112 and 113.

Resisting displacement of the shift rod 111 from its illustrated full line position is a biasing spring 114. This spring is of a helical type disposed in axial alignment with the shift rod with one end bearing against a collar 115 secured to the shaft. A threaded tube 116 secured to the housing in coaxial relationship to the shift rod and its biasing spring has an adjusting stop 117 threaded therein into contacting engagement with the spring. Turning the adjusting stop 117 to a selected position results in a biasing force of predetermined magnitude being applied to the shift rod.

The opening actuator 107 is mounted with its actuating shaft 109 coaxially aligned with the valve actuating stem 105, but diametrically opposed thereto at the opposite side of the shift rod 111. Mechanically coupling the shift rod and actuating shaft is the second toggle link 113 having its opposite ends pivotably connected to the respective components. When the valve element 104 is in a closed position, the toggle links 112 and 113 are axially aligned with each other, actuating shaft 109 and actuating stem 105 with the biasing spring 114 then assuring that the valve will be maintained in a closed position.

Mounting of the trigger actuator 108 with its actuating shaft 110 in coaxial alignment with the shift rod 111 is effected by a support housing 118 of elongated tubular configuration having a base flange adapted for mechanical attachment to the valve housing. A stop plate 119 is threaded into an upper portion of housing 118 containing the actuator 108 and forms a limit stop for restricting the downward displacement of the actuator bellows. Additionally, this stop plate 119 forms a guide to maintain the actuator shaft in alignment with the shift rod 111. An annular, inwardly projecting flange 120 is formed at the upper end of the housing 118 and secured to a base mounting plate 108a of the trigger actuator. A spring adjustment collar 121 is threaded onto the end of the actuating shaft 110 and bears against a helical biasing spring 122 extending coaxially with the shaft 110 and shift rod 111 between the valve housing and stop collar. The collar 121 is positioned on the actuating shaft 111 at a selected point by turning of the collar which can be readily accomplished by utilization of a suitable tool such as a screwdriver. The collar 121 is preferably formed with a lobed edge surface particularly adapted for interengagement with a screwdriver blade which can be conveniently inserted through axially extending slots 123 formed in the lower portion of the support housing 118. Turning of the spring adjustment collar 121 to a different position on the actuating shaft 110 thus effects a change in the compression of the spring 122 and its effective operating force. Functioning of this mounting is to provide means for adjustment of the temperature point at which the actuator will be effective to open the valve. Turning the collar 121 downwardly will result in a proportionally greater force being developed by the biasing spring 122 in resisting axial movement of the shaft 110 which may be caused by the flexible bellows actuator 108. It will also be noted that, with the trigger actuator in the illustrated position, there is a predetermined space between the opposed ends of the actuating shaft 110 and the shift rod 111. This spacing can be maintained regardless of the relative positioning of the spring adjustment collar 121 on the shaft 110 and thus assures that the trigger actuator 108 will not interfere with a closing operation of the valve mechanism.

Operation of this valve 46 is such that it will rapidly operate at its opening temperature point to open the valve element 104 relative to its valve seat in the valve chamber. In FIG. 6, the valve is shown in a closed position with it being assumed that the temperature in the solar panel is below the desired opening temperature point. As the temperature increases in the solar panel, the gas pressure developed in the bulb 47 and conduit 48 will increase and will tend to further expand the bellows actuators 107 and 108. Expansion of the opening actuator 107 is initially prevented by its link connection with the shift rod 111 as a consequence of the straight-line arrangement of the toggle links 112, 113 and valve stem 105 with the actuator shaft 109. As the developed gas pressure increases, the trigger actuator 108 will expand and axially displace its actuating shaft 110 against the opposing force of the biasing spring 122. When the temperature in the solar panel approaches the selected temperature at which it is desired that the valve 46 open and place the system in operation, the trigger actuator will extend its shaft 110 into contacting engagement with the shift rod. Continued increase in temperature will then be effective in concurrently displacing the shift rod 111 against the combined opposing force of the biasing springs 114 and 122. At the selected opening temperature point, the trigger actuator 108 will have developed sufficient force to overcome the biasing springs to thereby displace the shift rod 111 and position the toggle links 112, 113 so that they are no longer axially aligned with actuating shaft 109. Fast opening of the valve occurs as a consequence of the force developed by the opening actuator 107, once the shift rod 111 has been displaced a significant distance to the point where the toggle link pivot point 111a has been displaced from its center aligned position. At that time, the opening actuator 107 will rapidly displace the shift rod against the opposing force of the biasing spring 114 to the fully open position with the toggle links 112, 113 displaced to the broken line position.

The valve element 104 will remain in the open position until the temperature in the solar panel decreased to a predetermined temperature that is below the opening temperature. As the temperature drops below the opening temperature, the trigger actuator 108 will become ineffective and retract its actuating shaft 110 to a position where it is disengaged from the shift rod 111. However, the opening actuator 107 will continue to be effective in resisting the force exerted by the biasing spring 114 and thus maintain the valve in an open position. As the solar panel temperature approaches the predetermined closing temperature point, the biasing spring 114 will overcome the opening actuator and displace the shift rod 111 to the illustrated position and close the valve.

It will be readily apparent from the foregoing detailed description of the two embodiments of the invention that a particularly useful heat transfer system is provided having the novel advantageous feature of temperature control as to the heat utilization device. The temperature control components are integral with the system and respond to the systems' parameters in complete independence of any external apparatus. The gravity liquid return embodiment is particularly advantageous in that it is simple in construction and operation, but is capable of reliable performance in affecting the desired temperature control. The embodiment having an integral vertical liquid return enables the heat utilization device to be located a lower elevation than the evaporator. The liquid return is uniquely capable of assured liquid return which is independent of external ambient conditions and utilizes energy in the form of gas pressure totally internally generated for efficient, self-contained operation. Providing of deferred start-up by means of a temperature responsive valve which does not permit liquid flow into the evaporator from the accumulator tank until the solar panel attains a minimum predetermined temperature further assures that the systems will function in the desired manner.

Having thus described this invention, what is claimed is:

1. A heat transfer system utilizing a volatile fluid heat transferring medium comprising
   a fluid evaporator in heat receiving relationship with a heat source and operable to vaporize volatile fluid contained therein in a liquid state in response to receipt of heat from the heat source,
   a fluid condenser in heat transferring relationship with a heat utilizing device and operable to condense vaporized fluid contained therein to a liquid state as a consequence of transferring heat to the utilizing device,
   fluid conduit means interconnecting said evaporator and said condenser for enabling interflow of fluid therebetween, said conduit means including a storage accumulator for the fluid in a liquid state, first valve means selectively operable in response to a parameter of the fluid in the system to alternatively permit liquified fluid to flow through said conduit means to said evaporator or to prevent such flow and cause the liquified fluid flowing from said condenser to be retained in said storage accumulator, said valve means being responsive to the fluid parameter in controlling operation of the system whereby the temperature of the utilizing device is prevented from exceeding a predetermined maximum value, and a thermostatic valve interposed therein between said evaporator and said storage accumulator in flow controlling relationship, said thermostatic valve being responsive to the temperature of said evaporator and operative to permit fluid flow therethrough when the temperature of said evaporator exceeds a predetermined minimum magnitude.

2. A heat transfer system according to claim 1 wherein said thermostatic valve is operative to close and prevent fluid flow therethrough when the temperature of said evaporator drops below a predetermined magnitude which is less than the temperature at which it opens.

3. A heat transfer system according to claim 1 wherein said thermostatic valve is operable to open rapidly.

4. A heat transfer system utilizing a volatile fluid heat transferring medium comprising
   a fluid condenser in heat transferring relationship with a heat utilizing device and operable to condense vaporized fluid contained therein to a liquid state as a consequence of transferring heat to the utilizing device,
   a fluid evaporator in heat receiving relationship with a heat source and operable to vaporize volatile fluid contained therein in a liquid state in response to receipt of heat from the heat source, said evaporator disposed in relatively elevated relationship to said condenser,
   fluid conduit means interconnecting said evaporator and said condenser for enabling interflow of fluid therebetween, said conduit means being a closed system and including a storage accumulator for the fluid in a liquid state disposed in relatively elevated relationship to said evaporator, valve means selectively operable in response to a parameter of the fluid in the system to alternatively permit liquified fluid to flow through said conduit means to said evaporator or to prevent such flow and cause the liquified fluid flowing from said condenser to be retained in said storage accumulator, said valve means being responsive to the fluid parameter in controlling operation of the system whereby the temperature of the utilizing device is prevented from exceeding a predetermined maximum value, and liquified fluid return means interconnected in fluid communicating relationship with said condenser and said storage accumulator to return liquified fluid to said accumulator, said fluid return means including
   a liquified fluid collector tank having an inlet for receiving vaporized fluid from said evaporator, an outlet for discharge of liquified fluid collected therein and a fluid communication interconnection with said condenser to permit vaporized fluid flow to said condenser from said collector tank and return flow of liquified fluid, and
   a discharge control valve coupled with said fluid communicating interconnection to said condenser and selectively operable to permit or to prevent fluid flow through said interconnection, said discharge control valve responsive to the quantity of liquified fluid in said collector tank.

5. A heat transfer system according to claim 4 wherein said discharge control valve is responsive to the quantity of liquid accumulated in said collector tank and is operative to close when the quantity of liquid accumulated increases to a predetermined maximum and to open when the quantity of liquid accumulated decreases to a predetermined minimum.

6. A heat transfer system according to claim 5 wherein said discharge control valve includes a float actuating mechanism responsive to the liquid level in said collector tank.

7. A heat transfer system according to claim 4 wherein said conduit means includes a liquid return conduit interconnected between said collector tank and said storage accumulator for flow of liquid therebetween, said liquid return conduit having a check valve interposed therein in close proximity to said collector tank to substantially prevent any flow of liquid from said liquid return conduit into said collector tank.

8. A heat transfer system according to claim 7 wherein said storage accumulator includes an accumulator tank and a liquid holding tank, said liquid holding tank disposed in relatively elevated relationship to said accumulator tank, and a conduit interconnecting between said accumulator tank and said holding tank to permit gravity flow of liquid therethrough to said accumulator tank, said last mentioned conduit having a check valve interposed therein and operable to prevent a flow of liquid therethrough from said accumulator tank.

9. A heat transfer system according to claim 8 having a vent conduit interconnected between said liquid holding tank and said condenser to permit a flow of fluid therebetween when said discharge control valve is closed, said vent conduit connected to said liquid holding tank at a point above a predetermined maximum expected liquid level.

10. A heat transfer system according to claim 8 having a conduit interconnecting said accumulator tank and said evaporator in fluid flow relationship, said valve means interposed in said last mentioned conduit and including a valve element selectively positionable in either open or closed relationship to said outlet port whereby flow therethrough may alternatively be permitted or prevented.

11. A heat transfer system according to claim 8 having a vent conduit interconnecting said evaporator at an upper portion thereof in fluid flow relationship with said accumulator tank.

* * * * *